(12) United States Patent
Tenghamn

(10) Patent No.: US 7,468,932 B2
(45) Date of Patent: Dec. 23, 2008

(54) SYSTEM FOR NOISE ATTENUATION IN MARINE SEISMIC STREAMERS

(75) Inventor: Stig Rune Lennart Tenghamn, Katy, TX (US)

(73) Assignee: PGS Americas, Inc., Houston, TX (US)

( * ) Notice: Subject to any disclaimer, the term of this patent is extended or adjusted under 35 U.S.C. 154(b) by 300 days.

(21) Appl. No.: 11/129,474

(22) Filed: May 13, 2005

(65) Prior Publication Data
US 2008/0175098 A1 Jul. 24, 2008

(51) Int. Cl.
*G01V 1/18* (2006.01)
(52) U.S. Cl. .......................................... 367/17
(58) Field of Classification Search ................. 367/17, 367/167, 174
See application file for complete search history.

(56) References Cited

U.S. PATENT DOCUMENTS

| | | | | |
|---|---|---|---|---|
| 3,710,006 A * | 1/1973 | Davis | ........... | 174/101.5 |
| 3,744,016 A * | 7/1973 | Davis | ........... | 367/154 |
| 3,961,304 A * | 6/1976 | Bakewell, Jr. | ........... | 367/155 |
| 4,634,804 A * | 1/1987 | Spalding | ........... | 174/24 |
| 4,694,436 A * | 9/1987 | Gelfand | ........... | 367/20 |
| 4,953,146 A * | 8/1990 | McMurry | ........... | 367/191 |
| 5,278,804 A * | 1/1994 | Halvorsen | ........... | 367/18 |
| 5,523,983 A * | 6/1996 | Morningstar et al. | ........... | 367/154 |
| 6,019,652 A * | 2/2000 | Nielsen et al. | ........... | 441/133 |
| 6,211,964 B1 * | 4/2001 | Luscombe et al. | ........... | 356/477 |
| 6,477,111 B1 * | 11/2002 | Lunde et al. | ........... | 367/20 |
| 7,120,087 B2 * | 10/2006 | Lee et al. | ........... | 367/15 |
| 2004/0004907 A1 * | 1/2004 | Austad et al. | ........... | 367/154 |
| 2006/0023568 A1 * | 2/2006 | Fernihough et al. | ........... | 367/20 |
| 2006/0254490 A1 * | 11/2006 | Ryan et al. | ........... | 114/245 |

FOREIGN PATENT DOCUMENTS

EP 0 445 019 4/1991
WO WO 2004/034096 4/2004

OTHER PUBLICATIONS

S.P. Beerens, et al., "Flow noise analysis of towed sonar arrays", UDT99—Conference Proceedings Undersea Defense Technology, Jun. 29-Jul. 1, 1999, pp. 392-397, Nice France, Nexus Media Limited, Swanley, Kent.
J. Luscombe, "Tow noise suppression in marine hydrostreamers", EAGE 57th Conference and Technical Exhibition, Glasgow, Scotland, May 29-Jun. 2, 1995.

* cited by examiner

*Primary Examiner*—Deandra M Hughes
(74) *Attorney, Agent, or Firm*—E. Eugene Thigpen; Richard A. Fagin

(57) ABSTRACT

A marine seismic streamer section has at least one strength member positioned in the streamer section, a solid material, which may be a soft compliant solid material, substantially filling the marine seismic streamer section around the strength member; and means for mechanically decoupling the strength member from the solid material.

14 Claims, 2 Drawing Sheets

SYSTEM FOR NOISE ATTENUATION IN MARINE SEISMIC STREAMERS

CROSS-REFERENCES TO RELATED APPLICATIONS

Not Applicable

FEDERALLY SPONSORED RESEARCH OR DEVELOPMENT

Not Applicable

SEQUENCE LISTING, TABLE, OR COMPUTER LISTING

Not Applicable

BACKGROUND OF THE INVENTION

1. Field of the Invention

This invention relates generally to the field of geophysical prospecting and more particularly to the field of marine seismic surveys. Specifically, the invention is an apparatus for attenuating noise in marine seismic streamers.

2. Description of the Related Art

In the field of geophysical prospecting, knowledge of the subsurface structure of the earth is useful for finding and extracting valuable mineral resources, such as oil and natural gas. A well-known tool of geophysical prospecting is a seismic survey. In a seismic survey acoustic waves are transmitted from appropriate energy sources into the earth and the reflected signals are collected using an array of sensors. Seismic data processing techniques are then applied to the collected data to estimate the subsurface structure.

In a seismic survey, the seismic signal is generated by injecting an acoustic signal from on or near the earth's surface, which then travels downwardly into the subsurface of the earth. Appropriate energy sources may include explosives or vibrators on land and air guns or marine vibrators in water. When the acoustic signal encounters a seismic reflector, an interface between two subsurface strata having different acoustic impedances, a portion of the acoustic signal is reflected back to the surface, where the reflected energy is detected by a sensor.

Appropriate types of seismic sensors include particle velocity sensors in land surveys and water pressure sensors in marine surveys. However, particle acceleration sensors may be used instead of particle velocity sensors. Particle velocity sensors are commonly known in the art as geophones and water pressure sensors are commonly know in the art as hydrophones. Both seismic sources and seismic sensors may be deployed by themselves or, more commonly, in arrays.

In a typical marine seismic survey, a seismic vessel travels on the water surface, typically at about 5 knots, and contains seismic acquisition equipment, such as navigation control, seismic source control, seismic sensor control, and recording equipment. The seismic source control equipment causes a seismic source towed in the body of water by the seismic vessel to actuate at selected times. The seismic source may be of any type well known in the art of seismic acquisition, including airguns or water guns, or most commonly, arrays of airguns. Seismic streamers, also called seismic cables, are elongate cable-like structures towed in the body of water by the seismic survey vessel that tows the seismic source or by another seismic survey ship. Typically, a plurality of seismic streamers are towed behind a seismic vessel. The seismic streamers contain sensors to detect the reflected wavefields initiated by the seismic source and reflected from reflecting interfaces. Conventionally, the seismic streamers contain pressure sensors such as hydrophones, but seismic streamers may also contain water particle motion sensors such as geophones. The sensors are typically located at regular intervals along the seismic streamers.

Seismic streamers are typically divided into sections approximately 100 meters in length, and can extend to a length of thousands of meters. Position control devices such as depth controllers, paravanes, and tail buoys are used to regulate and monitor the movement of the seismic streamers. Seismic data gathering operations are becoming progressively more complex, as more sources and streamers are being employed. A common feature of these source and streamer systems is that they can be positioned astern of and to the side of the line of travel of the seismic vessel. The sources and streamers are submerged in the water, with the seismic sources typically at a depth of 5-15 meters below the water surface and the seismic streamers typically at a depth of 5-40 meters.

FIG. 1 is a side sectional view of a portion of a marine seismic streamer section. A typical streamer section includes an outer skin 11, strength members 12, spacers 13, and an electrical wire bundle 14. The outer skin 11 protects the interior of the streamer section from water ingress. Connectors (not shown) at the ends of each streamer section link the section mechanically, electrically and/or optically to adjacent sections and, hence, ultimately to the seismic towing vessel. The strength members 12, usually two or more, run down the length of each streamer section from end connector to connector, providing axial mechanical strength. Strength members 12 are typically made of fiber rope, such as Vectran fiber, which is a registered trademark of Hoechst Chemical Corp., New York. The wire bundle 14 also runs down the length of each streamer section, and includes electrical power conductors and data communication wires. In some instances, fiber optics for data communication are included in the wire bundle 14. Sensors 15, typically hydrophones or groups of hydrophones, are located within the streamer. The hydrophones 15 have sometimes been located within the spacers 13 for protection. The distance between spacers 13 is normally about 0.7 meters. A group of hydrophones 15, typically comprising 8 or 16 hydrophones 15, normally extends for a length of about 12.5 meters.

FIG. 1 is a schematic representation of a portion of the streamer section. In this representation, the outer skin 11 and strength members 12 are illustrated as straight and uniformly thick throughout the length of the streamer section. The outer skin 11 and strength members 12 are designed to be straight and uniform while they are not subject to external stress. The electrical wire bundle 14, on the other hand, is designed to be curved and nonuniform, so that it can deform readily as the streamer cable bends while turning in the water, or is being deployed from or retrieved onto the streamer winch for storage on the survey vessel.

The interior of the seismic streamers is filled with a core material 16 to provide buoyancy and desirable acoustic properties. For many years, most seismic streamers have been filled with a fluid core material 16. However, there are two main drawbacks with this type of design. The first drawback is leakage of the fluid into the surrounding water when a streamer section is damaged and cut. Since the fluids in the streamers are typically hydrocarbons, such as kerosene or light oil, this leakage may be an environmental problem. This damage can occur while the streamer is being towed through the water or it can occur while the streamer is being deployed from or retrieved onto the streamer winch on which streamers are typically stored on the seismic tow vessel.

The second drawback to using fluid-filled streamer sections is the noise generated by vibrations as the streamer is towed through the water. These vibrations develop internal pressure waves traveling through the fluid in the streamer sections, which are often referred to as "bulge waves" or "breathing waves". This noise is described, for example, in the paper S. P. Beerens et al., "Flow Noise Analysis of Towed Sonar Arrays", UDT 99—Conference Proceedings Undersea Defense Technology, Jun. 29-Jul. 1, 1999, Nice, France, Nexus Media Limited, Swanley, Kent.

FIG. 2 is a side sectional view of a portion of a streamer section experiencing bulge wave noise. In the ideal situation of a streamer moving at constant speed, the components of the streamer—the outer skin 11, strength members 12, spacers 13, wire bundle 14, connectors, and fluid core material 16—all move in unison and do not move relative to each other. In realistic conditions, however, vibrations of the seismic streamer leading to transient motion of the strength members 12 are caused by such events as pitching and heaving of the seismic vessel, paravanes, and tail buoys attached to the streamers; strumming of the towing cables attached to the streamers caused by vortex shedding on the cables, or operation of depth-control devices located on the streamers. The arrow 17 designates the direction of tow in FIG. 2, which is also the direction in which the strength members 12 are being irregularly pulled. The transient motion of the strength members displaces the spacers 13 or connectors, causing pressure fluctuations in the fluid core material 16 that are detected by the hydrophones 15. The pressure fluctuations radiating away from the spacers 13 or connectors also cause the flexible outer skin 11 to neck in, as depicted at 21, and bulge out, as depicted at 22, as a traveling wave. The outer skin 11 is no longer straight as in the ideal situation depicted in FIG. 1, above. The bulging 22 of the outer skin 11 in this traveling wave gives this phenomenon one of its names—bulge waves.

In addition, there are other types of noise, often called flow noise, which can affect the hydrophone signal. For example, vibrations of the seismic streamer can cause extensional waves in the outer skin 11 and resonance transients traveling down the strength members 12. A turbulent boundary layer created around the outer skin 11 of the streamer by the act of towing the streamer can also cause pressure fluctuations in the fluid core material 16. The extensional waves, resonance transients, and turbulence-induced noise are typically much smaller in amplitude than the bulge waves. Bulge waves are usually the largest source of vibration noise because these waves travel in the fluid core material 16 filling the streamer sections and thus act directly on the hydrophones 15.

There are several ways to reduce the noise problem in fluid filled steamer sections. For example, a first approach is to introduce compartment blocks in the sections to impede the vibration-caused bulge waves from traveling continuously along the streamer. The noise can be isolated and thus attenuated. A second approach is to introduce open cell foam into the interior cavity of the streamer section. The open cell foam restricts the flow of the fluid fill material 16 in response to the transient pressure change and causes the energy to be dissipated into the outer skin 11 and the foam over a shorter distance. A third approach to address the noise problem is to combine several hydrophones 15 into a group to attenuate a slow moving wave. An equal number of hydrophones 15 are positioned between or on both sides of the spacers 13 so that pairs of hydrophones 15 sense equal and opposite pressure changes. Summing the hydrophone signals from a group can then cancel out some of the noise.

Another approach to eliminating the bulge waves in the fluid core material 16 is to eliminate the fluid from the streamer sections, so that no medium exists in which bulge waves can develop. This approach is exemplified by the use of so-called solid streamers, using streamer sections filled with a solid core material 16 instead of a fluid. However, in any solid type of material, some shear waves will develop, which can increase the noise detected by the hydrophones 15. (Note that shear waves cannot develop in a fluid fill material 16 since fluids have no shear modulus.) Additionally, many conventional solid core materials 16 are not acoustically transparent to the desired pressure waves.

A further approach to solving the noise problem is to replace the fluid core material 16 in a streamer section with a softer solid core material 16. The introduction of a softer solid material 16 may block the development of bulge waves, as compared to a fluid core material 16. A softer solid material 16 may also attenuate the transmission of shear waves, as compared to a harder solid core material 16. However, there can still be a substantial transmission of shear waves through the softer solid material 16 to the hydrophones 15. One approach to this problem of shear waves is described in co-pending U.S. patent application Ser. No. 11/059,497, "Apparatus for Attenuating Noise in Marine Seismic Streamers", filed on Feb. 16, 2005, assigned to the assignee of the present application and having as a co-inventor the inventor of the present application. This application describes a marine seismic streamer, a hydrophone housing positioned in the marine seismic streamer, the hydrophone housing having ends and substantially rigid side walls, a hydrophone positioned in the hydrophone housing, a soft compliant solid material filling the housing and the marine seismic streamer, and openings in the hydrophone housing adapted to substantially permit passage of pressure waves and to substantially attenuate passage of shear waves.

Using a soft compliant material 16 may eliminate most of the problem with bulge waves, but noise from longitudinal transient waves traveling down the strength members 12, caused by the so-called Poisson effect, will still be present. Thus, a need exists to further improve the attenuation of noise caused by longitudinal waves transmitted through the strength members 12 in seismic streamers.

BRIEF SUMMARY OF THE INVENTION

The invention is an apparatus for attenuating noise in marine seismic streamers. The invention comprises a marine seismic streamer section, one or more strength members 12 positioned in the marine seismic streamer section, a solid fill material 16 substantially filling the marine seismic streamer section, and a means for mechanically decoupling the strength members 12 from the solid fill material 16. In a preferred embodiment of the invention, the solid fill material comprises a soft compliant solid material In one embodiment, the means for mechanically decoupling comprises a sleeve positioned around the strength members 12 which prevents the strength members 12 from adhering to the solid fill material 16.

In another embodiment, the means for mechanically decoupling comprises a liquid material positioned between the strength members 12 and the solid fill material 16 which prevents the strength members 12 from adhering to the solid fill material 16.

In yet another embodiment, the means for mechanically decoupling comprises the strength members 12, the solid fill material 16 or both being composed of materials that do not adhere to each other.

BRIEF DESCRIPTION OF THE DRAWINGS

The invention and its advantages may be more easily understood by reference to the following detailed description and the attached drawings, in which.

Figure 1:
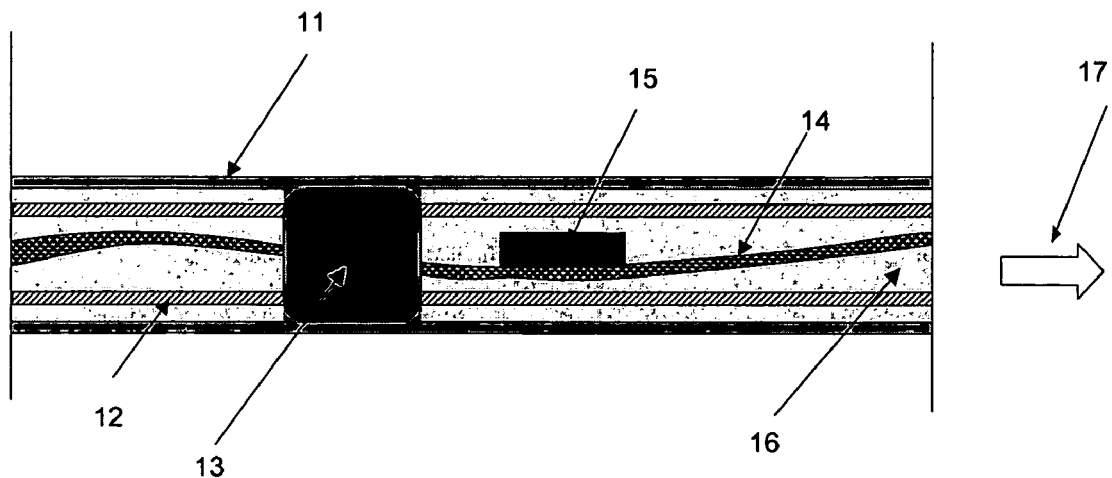
FIG. 1 is a side sectional view of a portion of a marine seismic streamer section.
Figure 2:
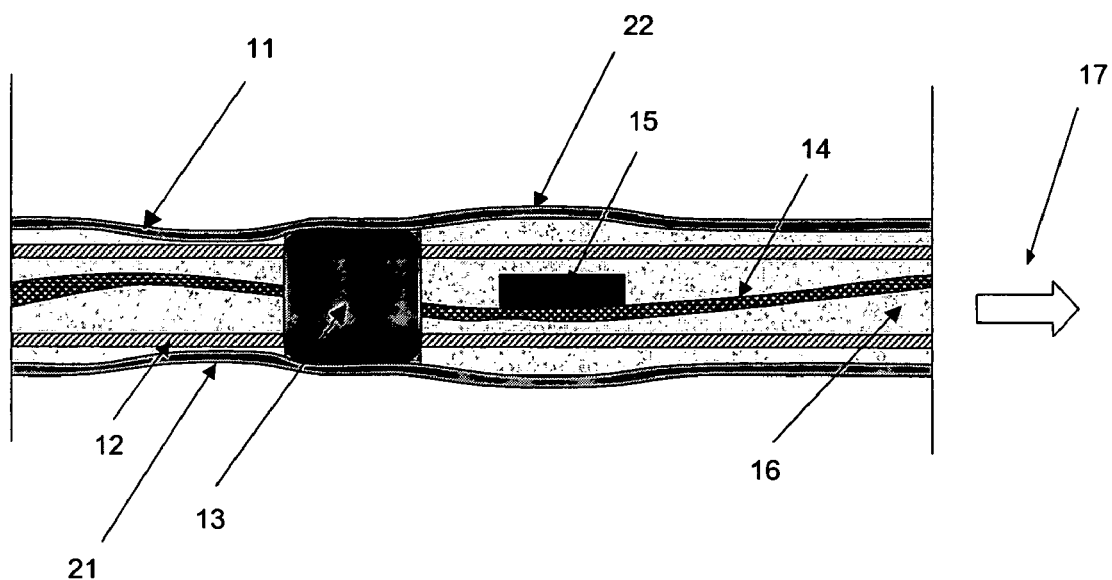
FIG. 2 is a side sectional view of a portion of a streamer section experiencing bulge wave noise.

While the invention will be described in connection with its preferred embodiments, it will be understood that the invention is not limited to these. On the contrary, the invention is intended to cover all alternatives, modifications, and equivalents that may be included within the scope of the invention, as defined by the appended claims.

DETAILED DESCRIPTION OF THE INVENTION

The invention is a system for attenuating noise in marine seismic streamers. In particular, the invention is a system for attenuating the noise that arises from the Poisson effect, which causes longitudinal transient waves to travel down the strength members in the seismic sections. Thus, the generation of transient waves by the Poisson effect will first be discussed.

Stress is the application of force to a material, such as a strength member in a streamer section being towed through the water. Stress is measured as force per unit area. Thus, applying a longitudinal force f to a cross-sectional area S of a strength member yields a stress which is given by:

$$\frac{f}{S}. \tag{1}$$

The force f could be compressional, leading to longitudinally compressing the strength member, or tensional, leading to longitudinally extending the strength member. In the case of a strength member in a seismic section, the force will typically be tension.

Strain is the fractional change in dimension or volume of the deformation induced in the material by applying stress. For most materials, strain is directly proportional to the stress, and depends upon the flexibility of the material. This relationship between strain and stress is known as Hooke's law:

$$\frac{f}{S} = -Y\frac{\partial \xi}{\partial x}. \tag{2}$$

Here, Y is Young's modulus, or the modulus of elasticity, and is a characteristic property of the inherent flexibility of the material. The modulus of elasticity Y is the ratio of the longitudinal stress to the longitudinal strain of a cylindrical rod, such as a strength member, under tension. If the variable $\xi$ represents the longitudinal displacement of the strength member in the x direction, then the longitudinal strain is given by:

$$\frac{\partial \xi}{\partial x}. \tag{3}$$

Rewriting Equation (2) for the longitudinal force f on the strength member yields:

$$f = -S \Box Y \frac{\partial \xi}{\partial x}. \tag{4}$$

A longitudinal displacement of the strength member will create a corresponding transverse (lateral) displacement. For example, a longitudinal tension will create a transverse contraction. If the variable $\zeta$ represents the transverse displacement of the strength member in the z direction, then the transverse strain is given by:

$$\frac{\partial \zeta}{\partial x}. \tag{5}$$

In the case of a transverse contraction of a cylindrical rod, such as a strength member, caused by a longitudinal tension, the ratio of the transverse strain (contraction) to the longitudinal strain (tension) is known as Poisson's ratio $\sigma$, and is thus given by:

$$\sigma = -\frac{\frac{\partial \zeta}{\partial z}}{\frac{\partial \xi}{\partial x}}. \tag{6}$$

The value for Poisson's ratio $\sigma$ will vary in general in the range:

$$0 \leq \sigma \leq 0.5, \tag{7}$$

where the upper boundary, 0.5, represents a material with no ability to sustain shear, such as a fluid.

The Poisson's ratio of Equation (6) can also be expressed for the strength member in terms of changes, represented by $\Delta$, in radius r and length l by:

$$\sigma = -\frac{\frac{\Delta r}{r}}{\frac{\Delta l}{l}}. \tag{8}$$

As the longitudinal wave travels along the strength member, the changes in the radius r and the length l of the strength member will cause a change in volume V of the strength member, expressed by:

$$\frac{\Delta V}{V} = (1 - 2\sigma)\frac{\Delta l}{l}. \tag{9}$$

The local volume change in the strength member will create noise in the soft compliant solid material, because the strength member and the soft compliant solid material are typically mechanically and acoustically coupled.

Figure 3:
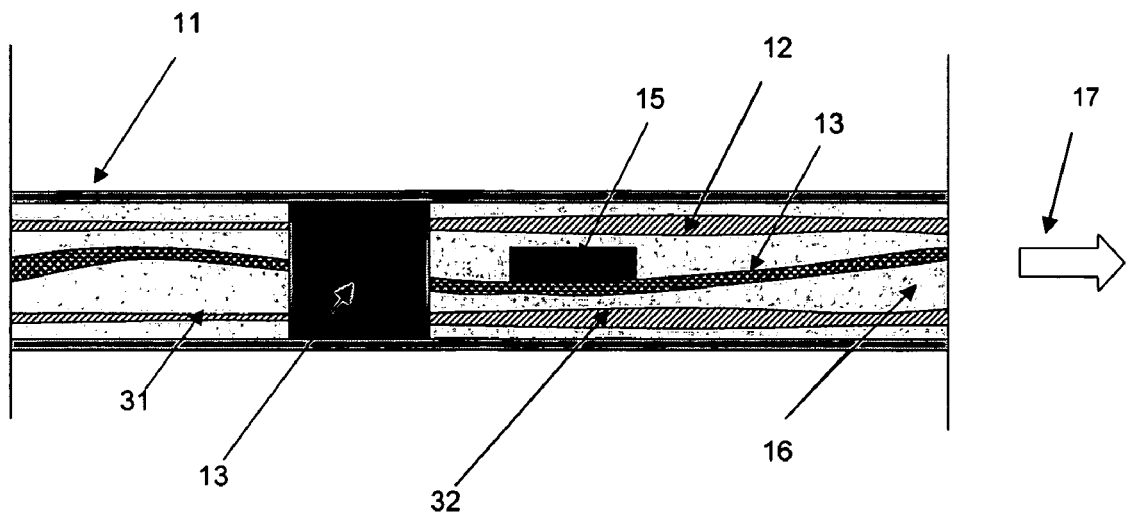
FIG. 3 is a side sectional view of a portion of a streamer section with noise transmitted through the strength members.

The Poisson effect is characterized by changes in the diameter of the strength members as the tension applied to the strength members changes. Therefore, the volume changes resulting in diameter changes in the strength members may induce noise in the form of pressure waves and/or shear waves into the soft compliant solid material, if the strength members and the soft compliant solid material are sufficiently mechanically and acoustically coupled. FIG. 3 is a side sectional view of a portion of a streamer section experiencing noise transmitted through the strength members 12, as caused by the Poisson effect. The strength members 12 are no longer uniformly thick along their lengths as in the ideal situation depicted in FIG. 1, above. The strength members 12 are experiencing tension from the direction designated by the arrow 17. The Poisson effect has caused a diameter contraction in the strength member 12, as designated at 31 and a diameter extension in the strength member 12, as designated at 32. These deformations 31, 32 in the strength members 12 may cause pressure waves and/or shear waves in the soft compliant solid material 16 to be transmitted as noise to the hydrophones 15.

The extent of the transmission of the longitudinal wave through the streamer section will depend upon the modulus of elasticity Y for the strength member, which can be interpreted as the degree of stiffness of the strength member. The lower the value for the modulus of elasticity Y is for the strength member in a streamer section, the more compliant the strength member is, and hence the entire streamer section is. Thus, for low values for modulus of elasticity Y, more transient energy will dissipate as heat within the section, instead of passing through the section. Because of the relatively high tensile stiffness of the strength members, transients generally travel down the strength members at velocities near to or greater than the sound velocity in water, typically in the range of 1000 to 1500 meters per second. See J. Luscombe, EAGE, 7th conference, Glasgow, 29 May-2 Jun. 1995. The actual velocity depends mainly on the strength member material and the tension in the streamer cable.

In general, in a preferred embodiment, the invention comprises a marine seismic streamer section, one or more strength members 12 positioned in the marine seismic streamer, a soft compliant solid material 16 filling the marine seismic streamer, and a means for mechanically decoupling the strength members 12 from the soft compliant solid material 16. Mechanically decoupling the strength members 12 from the soft compliant solid material 16 decouples the movement of the strength members 12 due to transient waves from a soft compliant solid material 16 filling the marine seismic streamer, and consequently impedes the transmission of both pressure waves and shear waves from the strength members 12 to the soft compliant solid material 16. Mechanical decoupling attenuates any noise in the form of pressure waves or shear waves being transmitted from the strength members 12 through the soft compliant solid material 16 to the hydrophone 15 or any other type of sensor 15.

Figure 4:
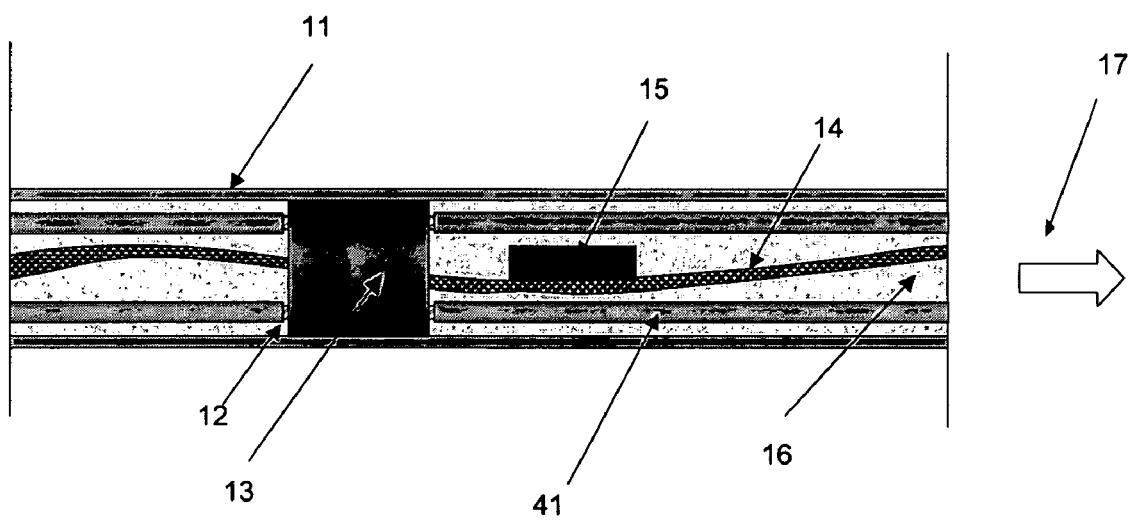
FIG. 4 is a side sectional view of a portion of a streamer section with protective sleeves around the strength members, according to one embodiment of the invention.

The invention contemplates several embodiments for mechanically decoupling the strength members 12 from the soft compliant material 16 in the streamer sections. In one embodiment, the means for decoupling comprises a sleeve positioned around at least a portion of the strength members 12 which prevents the strength members 12 from adhering to the soft compliant solid material 16. In a particular embodiment, the sleeve comprises a solid material separating and mechanically decoupling the strength members 12 from the soft compliant material 16. For example, the sleeves 41 may comprise substantially rigid side walls which cover each strength member 12. FIG. 4 is a side sectional view of a portion of a streamer section with protective sleeves 41 around the strength members 12, according to this embodiment of the invention. For example, flexible plastic tubes 41 could be employed. The invention is not limited to the particular material used to construct the protective sleeves (or tubes) 41.

In another embodiment, the means for decoupling comprises a liquid material positioned between the strength members 12 and the soft compliant solid material 16 which prevents the strength members 12 from adhering to the soft compliant solid material 16. In a particular embodiment, the liquid material comprises a slippery liquid substance which covers each strength member 12. For example, the slippery substance could include, but is not limited to, grease, such as silicon grease, wax, and oil.

In yet another embodiment, the strength members 12 and soft compliant solid material 16 are themselves adapted to not adhere to each other. Thus, in one embodiment, the strength members 12 are composed of a material that does not adhere to materials typically utilized as the soft compliant solid material 16. For example, the strength members 12 could be composed of waxed Vectran rope or rope with embedded Teflon tape woven into the rope fiber. In a second embodiment, the soft compliant solid material 16 is composed of a material that does not adhere to materials typically used as the strength members 12. For example, the soft compliant solid material 16 could be composed of soft compliant void filler. In a third embodiment, both the strength members 12 and the soft compliant solid material 16 are each composed of materials selected to be non-adhering to the other material.

Although a preferred embodiment of the invention has been described in terms of a soft compliant material 16 that substantially fills the streamer section around the strength member 12, the invention is applicable to any seismic streamer section that includes a solid fill material 16 having a tendency to adhere to the strength members 12.

It should be understood that the preceding is merely a detailed description of specific embodiments of this invention and that numerous changes, modifications, and alternatives to the disclosed embodiments can be made in accordance with the disclosure here without departing from the scope of the invention. The preceding description, therefore, is not meant to limit the scope of the invention. Rather, the scope of the invention is to be determined only by the appended claims and their equivalents.

I claim:

1. An apparatus for attenuating noise in marine seismic streamers, comprising:
   a marine seismic streamer section;
   at least one strength member positioned in the marine seismic streamer section;
   a solid fill material substantially filling the marine seismic streamer section around the strength member; and
   a means for mechanically decoupling the strength member from the solid fill material.

2. The apparatus of claim 1, wherein the means for mechanically decoupling comprises:
   a sleeve positioned around at least a portion of the strength member which prevents the strength member from adhering to the solid fill material.

3. The apparatus of claim 2, wherein the sleeve separates and mechanically decouples the strength member from the solid fill material.

4. The apparatus of claim 3, wherein the sleeve comprises:
   A tube with substantially rigid side walls which substantially covers the strength member.

5. The apparatus of claim 1, wherein the means for mechanically decoupling comprises:
   a liquid material positioned between the strength member and the solid fill material which prevents the strength member from adhering to the solid fill material.

6. The apparatus of claim 5, wherein the liquid material comprises:
   a slippery substance which substantially covers the strength member.

7. The apparatus of claim 6, wherein the slippery substance comprises a grease-like material.

8. The apparatus of claim 1, wherein the means for mechanically decoupling comprises:
   the strength member comprising a material that does not adhere to the solid fill material.

9. The apparatus of claim 1, wherein the means for mechanically decoupling comprises:
   the solid fill material comprising a material that does not adhere to the strength member.

10. The apparatus of claim 1, wherein the means for mechanically decoupling comprises:
    the strength member and the solid fill material, each comprising materials that do not adhere to each other.

11. The apparatus of claim 1 wherein said solid fill material comprises a soft compliant material.

12. The apparatus of claim 2 wherein said solid fill material comprises a soft compliant material.

13. The apparatus of claim 5 wherein said solid fill material comprises a soft compliant material.

14. The apparatus of claim 10 wherein said solid fill material comprises a soft compliant material.

* * * * *